March 9, 1948. C. L. JOHNSON ET AL 2,437,536
BOOSTER TYPE SERVO-MOTOR SYSTEM
Filed Sept. 6, 1943 3 Sheets-Sheet 1

Inventors
Clarence L. Johnson
Robert R Richolt
By George C. Sullivan
Agent

March 9, 1948.  C. L. JOHNSON ET AL  2,437,536
BOOSTER TYPE SERVO-MOTOR SYSTEM
Filed Sept. 6, 1943  3 Sheets-Sheet 2

Inventors
Clarence L. Johnson
Robert R. Richolt

By *George C. Sullivan*
Agent

March 9, 1948.  C. L. JOHNSON ET AL  2,437,536
BOOSTER TYPE SERVO-MOTOR SYSTEM
Filed Sept. 6, 1943  3 Sheets-Sheet 3
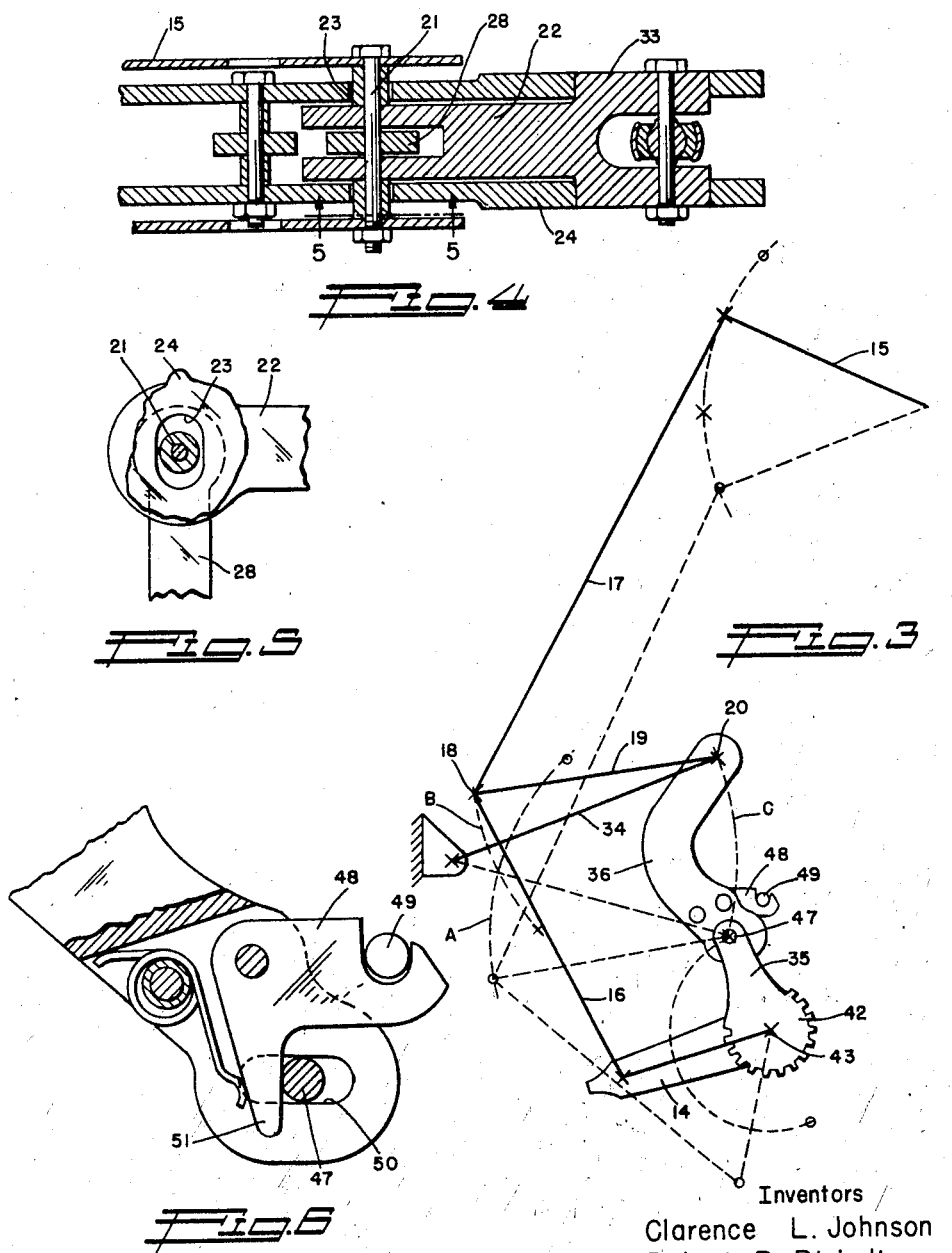
Inventors
Clarence L. Johnson
Robert R. Richolt
By George C. Sullivan
Agent Patented Mar. 9, 1948

2,437,536

UNITED STATES PATENT OFFICE 2,437,536

BOOSTER TYPE SERVOMOTOR SYSTEM

Clarence L. Johnson, Encino, and Robert R. Richolt, Tujunga, Calif., assignors to Lockheed Aircraft Corporation, Burbank, Calif.

Application September 6, 1943, Serial No. 501,350

12 Claims. (Cl. 121—41)

1

This invention relates to the emergency manual operation of booster powered control surfaces of an aircraft, wherein the physical effort required to operate such control surfaces is normally beyond the capabilities of the pilot. To this end we vary the leverage or ratio in such a way that the normal range of the control stick or column produces a full range of movement of the control surface when the booster is effective, and a limited and selected range of control surface movement under emergency manual operation, in effect increasing the mechanical advantage to enable the pilot to maneuver the airplane under landing conditions, for example.

A large airplane will have such heavy loads on the aerodynamic control surfaces, at normal speeds, as to render it impossible to manually operate such controls. However, under landing conditions the speed and load at the controls are substantially reduced, so that it becomes practical to provide a limited range of emergency manual control primarily for use under these conditions. By reducing the range of control surface movements, and increasing the ratio or mechanical advantage the pilot would be physically able to accomplish emergency operation of the controls to enable a landing to be made at the usual landing speeds, which are substantially less than normal operating speeds. Since the present invention is intended to provide an emergency control, it has been shown as applied to the elevator controls although equally suitable for use with rudder or aileron booster systems. The choice of the elevator as most needing an emergency control is because a large airplane such as would require both elevator and rudder boosters would normally be multi-engined, one differential manipulation of the engine throttles could be used in an emergency, upon failure of the normal rudder booster.

It is accordingly an object of this invention to provide an improved and simplified power booster control system incorporating a manual or overriding shift capable of handling the entire loads on the control surface under emergency conditions, as upon failure or malfunctioning of the power booster. The embodiment of our invention chosen for illustrative purposes provides an increased mechanical advantage over a selected and limited range of movement, in effect changing or shifting the ratio so that the manually operated control lever or column retains a full range of movement while the controlled surface has a restricted range with an increased leverage available at the control column. This shift or

2 change in ratio can be accomplished without at any time disconnecting the control column from the control surface, so that no risk of complete loss of control is involved. The arrangement also provides for locking the shift mechanism in either position of adjustment so that breakage of the operating connections thereto would not permit movement of the shift or jamming thereof at an intermediate position.

It is also an object of this invention to provide a variable leverage or mechanical advantage between the pilot's control lever and the aerodynamic surface to be controlled, whereby a large range of surface movement is obtainable at the slower maneuvering speeds, while a more limited range of response, at a correspondingly increased leverage, is available for the control of the surface at high speeds, wherein the increased aerodynamic or hinge moment loads on the surface would otherwise require increased effort by the pilot with a resulting overload of the control system connecting to the control surface.

Other and further important objects of this invention will be apparent from the disclosures in the specification and the accompanying drawings.

This invention in its preferred form is illustrated in the drawings and hereinafter more fully described.

In the drawings—

Figure 3 is a partially schematic showing of the linkage from the pilot controlled walking beam to the elevator horn. The full lines represent the linkage at the maximum down elevator position under emergency operation, while the dashed lines show the linkage at the maximum up elevator position after shifting to the normal power booster control.

Figure 4 is an enlarged fragmentary section on the line 4—4 of Figure 2 to show the connections between the pilot's control linkage and the booster.

Figure 5 is an enlarged fragmentary section on the line 5—5 of Figure 4 showing the lost motion connection necessary between the pilot's control linkage and the elevator horn in order to operate the valve of the booster system.

Figure 6 is an enlarged fragmentary detail, partly in section, of the latch holding the shifter mechanism at either extreme of its motion.

Figure 7 is a fragmentary section on the line 7—7 of Figure 2 showing the shifter mechanism in more detail.

Figure 8 is a chart of the comparative hinge moments and angular range available with the normal and emergency shift.

As shown on diagrams—

The present invention is primarily intended for use as an emergency operating mechanism adapted to change the leverage and ratio or range of control of a normally power operated control surface, to enable the pilot to directly control the surface in the event of failure or malfunctioning of the power control. Such a ratio or range shift is applicable to various types of power boosters heretofore proposed, especially in connection with true boosters acting to supplement and respond to the normal pilot's effort or forces applied at the control column or stick, such arrangements being desirable to enable the pilot to feel both proportion of the force actually applied to the control surface, and as a corollary, to feel any loads introduced into the system by aerodynamic forces acting directly on the control surfaces. Thus, this invention is not limited to the particular type of booster shown herein, which has been chosen merely for convenience, and is more fully described in the prior application of Robert R. Richolt, Serial Number 498,021, filed August 9, 1943, entitled Power booster control, now Patent No. 2,424,901.

However, this invention may also be applied to the aerodynamic controls of airplanes not provided with power booster systems, in which case the increased mechanical advantage, obtainable over a decreased range of movement, is desirable under high speed operating conditions wherein the load on the control surface greatly increases while the required range of surface movement is much less due to the increased effectiveness of such surfaces at small deflections.

Figure 1:
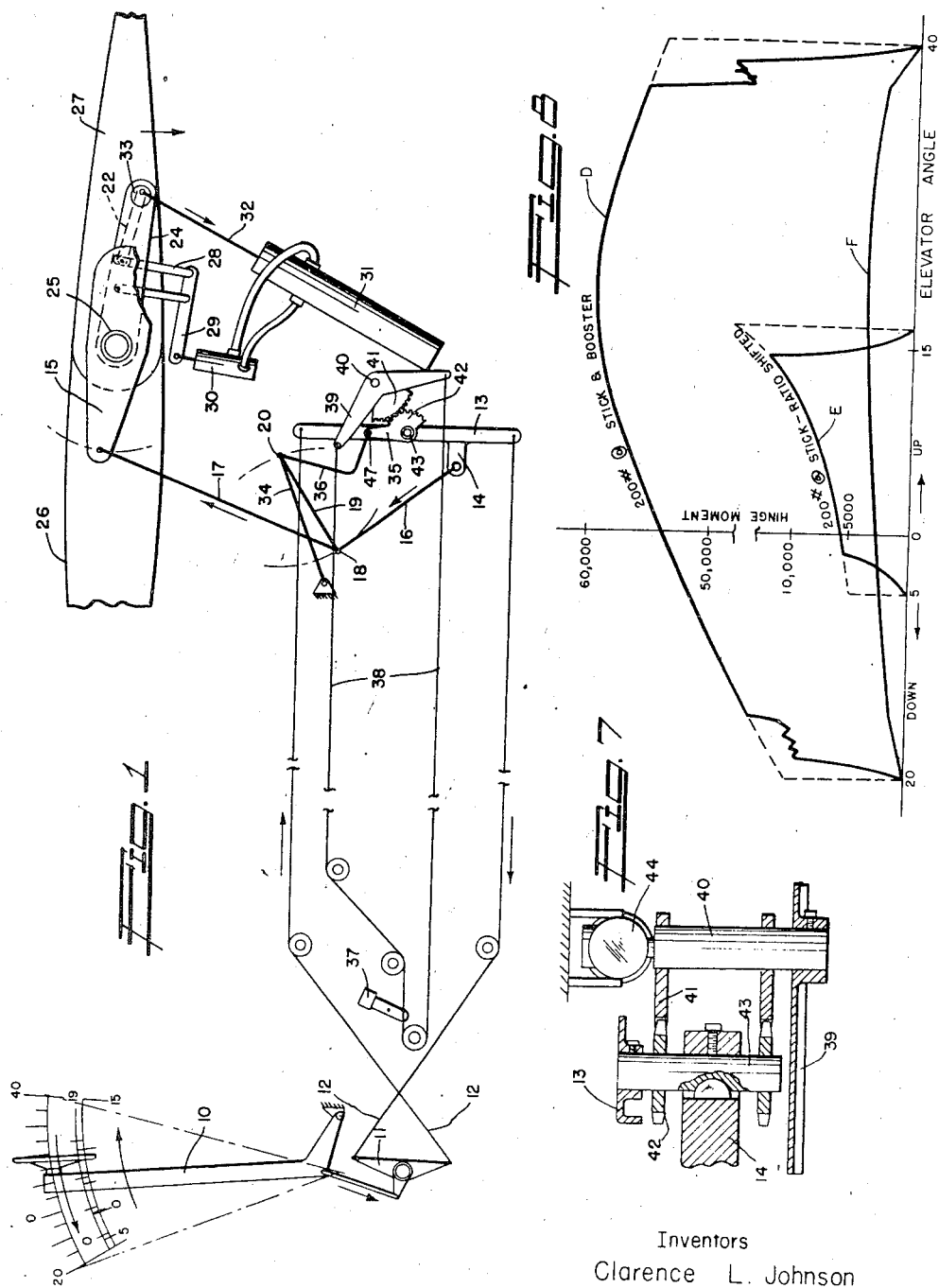
Figure 1 is a schematic showing of a hydraulic booster arrangement embodying the shift to an emergency manual control which features the present invention.
Figure 2:
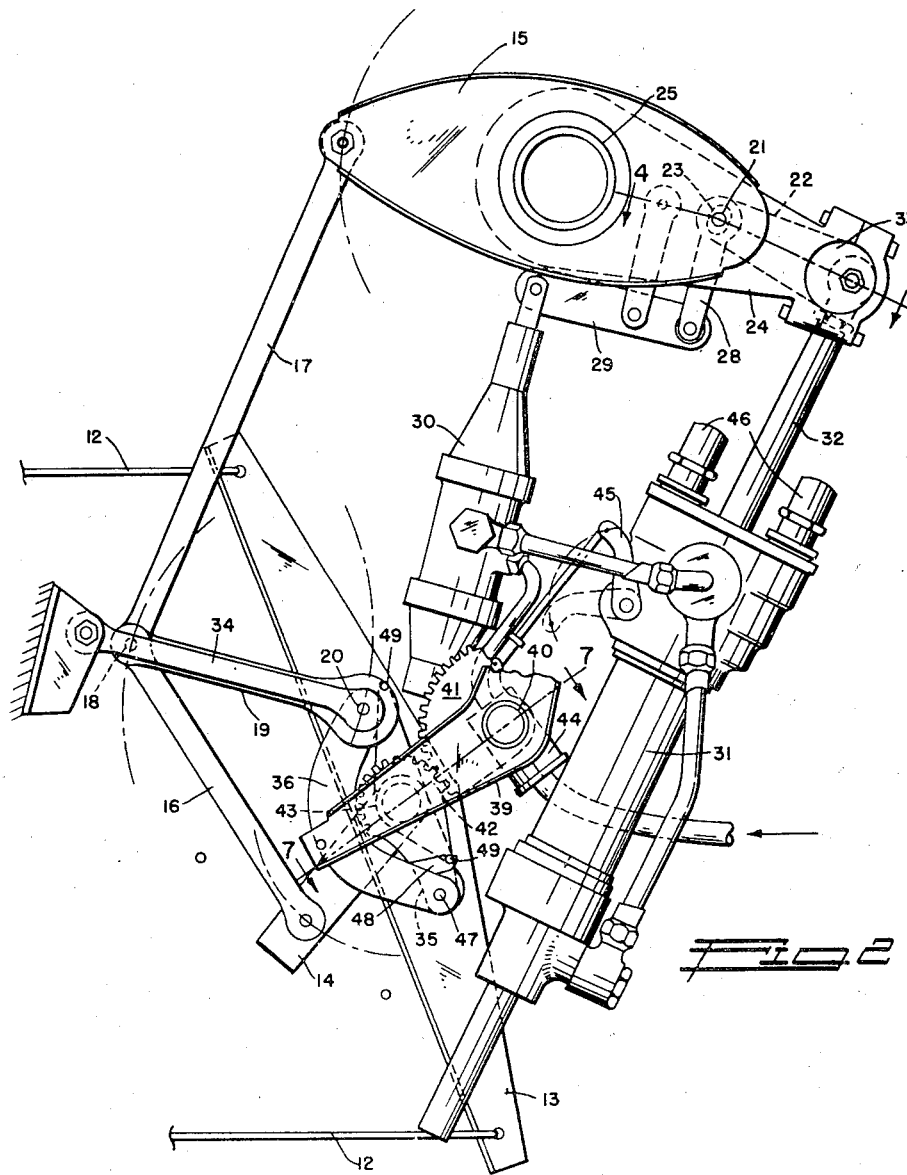
Figure 2 is a detailed side elevation of the hydraulic boost mechanism operating the elevator torsion tube, the supporting and control surface structure having been omitted for clearness. In this view the shift arrangement is positioned for normal use of the booster system.

The hydraulic booster control system shown schematically in Figure 1, and in more detail in Figure 2, comprises a conventional pilot's control column 10, the fore and aft movement of which operates a walking beam 11 and cables 12 to produce a similar movement in a second walking beam 13 adjacent the elevator mechanism. A lever 14 rigid with the walking beam 13 operates a horn 15 through a pair of push rods 16 and 17 the connecting pivot 18 of which rocks an idler lever 19, movement of the free end 20 of which idler lever 19 controls the ratio shift to be later described in more detail. The horn 15 is directly pivoted at 21 to a feel lever 22 the pivot 21 being arranged with limited freedom of movement in an elongated slot 23 in an elevator horn lever 24 which is rigid with a torque tube 25 journaled at the rear of the stabilizer surface 26 and in turn supporting the elevator surfaces 27 for pivotal movement relative to the stabilizer surface. The purpose of the limited freedom of the pivot 21, as more clearly shown in Figure 5, is to operate one link 28 of a quadrilateral linkage, another link 29 of which operates a booster valve 30 controlling the admission and exhaust of pressure fluid to a power cylinder 31, the piston rod 32 of which is eccentrically connected to the hub 33 about which the feel lever 22 pivots upon movement of the horn 15 relative to the elevator horn lever 24.

In the normal operation of the power booster, the pilot puts forth a proportion of the force applied to the elevator horn, and the booster cylinder supplies the balance of the necessary power, the proportion being determined by the eccentricity of the piston rod connection in the hub 33. The pilot's "feel" is determined by the total load on the lever 24 as inversely divided in proportion to the lever arm or eccentricity of the piston rod 32 relative to the center of the eccentric 33 and the combined lever arm of the horn 15 and eccentric lever 22, the pilot's load or feel being reduced in proportion to the mechanical advantage of the ratio of these lever arms. In the co-pending Richolt application previously referred to, the pilot's "feel" is transmitted direct from the walking beam 13 to the pivot 21; the horn 15 and push rods 16 and 17 of this application being substituted for such a direct connection, to permit a change in the mechanical advantage by alteration of the push rod movements, as will now be described.

The lever 22 carrying the eccentric 33 has a lost motion pin connection 21 to the horn 15 as shown in Figure 5. The pin 21 transmits "feel" to the pilot from rudder horn lever 24, and the lost motion at the pin is sufficient to open the valve 30 since the piston rod 32 is hydraulically locked in the power cylinder 31 when the valve 30 is closed. The eccentric 33 acts as a lever relative to the horn 24 to either slightly move the latter, or to respond to slight movements thereof according to whether the pilot is moving the controls or aerodynamic forces are being transmitted to the pilot.

When the pivot point 20 of the idler lever 19 is in the position shown in solid lines in Figure 2 the full range of angular movement of the walking beam 13 corresponds to the full range of elevator movement, in the case shown providing 20° down and 40° up elevator movements with the aid of the power booster. Under these conditions the connection 18 between the push rods 16 and 17 swings on the arc A in Figure 3. With the power boost in operation, 200 pounds force on the control column 10 is capable of handling up to 60,000 inch pounds hinge moment in the rudder, as shown by the upper curve D in Figure 8.

In order to shift over to full manual operation, the pivot point 20 of the idler lever 19 is shifted over to the full line position in Figures 1 and 3, wherein the connection 18 swings on the arc B in Figure 3. The geometry of the push rods 16 and 17 and the idler lever 19 is then such that the leverage or mechanical advantage increases as the elevator is moved upwardly from neutral, as shown in the curve E in Figure 8. With this shift arrangement the full travel of the walking beam 13 provides approximately 20° total movement of the elevator which total is preferably predominantly an up movement in the case of the elevator, in order to facilitate landing maneuvers. While of course the 20° total movement could be divided as desired, i. e., taken in any part of the full power range of 60°, for emergency operation of the elevators under maneuvering conditions the critical requirement is chiefly an ability to pull out of a glide and to level off for landing. Under slow speed maneuvering conditions, say 115 miles per hour in the case of the chosen illustration, the foregoing arrangement is capable of providing over 10,000 inch pounds hinge moment, enough to handle a very large airplane under such conditions, especially if aided by full use of the trimming tabs customarily provided on control surfaces.

It will be noted that the chart of Figure 8 is discontinuous in that the range of hinge moments between 10,000 and 50,000 inch pounds have been omitted, since the range of angular movements and the increasing mechanical advantage under manual operation are the points of principal interest. A third curve F has been added to show the hinge moments available due to pilot force without the aid of the booster and shift, for purposes of comparison with the forces available when aided by the shift. The relation between curves D and F of course vary with the chosen boost proportion, as determined by the eccentricity of the piston rod connection to the hub of the feel lever. The decreased range of angular control surface movement with increasing hinge moments is due to cable stretch as a result of the increased forces imposed thereon by the pilot.

The curve F of Figure 8 also illustrates by comparison with E the mechanical advantage available in a control system not having a power booster. In this case the control movements and leverage available under condition F would be adequate to handle a medium sized airplane under maneuvering and slow speed conditions, while a shift to the ratio represented by condition E would permit adequate control at higher speeds when higher aerodynamic forces act on the control surface. Under such last mentioned conditions the increased load is commonly referred to as stiffening of the controls and without such a shift as proposed, the extra exertion or pilot force necessary would overload the connecting system.

It will be evident that some means must be provided to support the pivot point 20 in its two positions. We have chosen to show a stirrup link 34 for this purpose, the arrangement being such that the pivot 20 swings on the arc C in Figure 3. It will be obvious that any convenient mechanism may be used to shift the pivot 20 between its two desired positions. As an example, we have shown an arrangement wherein a lever 35, coaxial with the pivotal axis of the lever 14 and walking beam 13, has a bent link 36 connection to the pivot 20. When this lever 35 is rotated 180° from the position of Figure 2 and the position of Figure 3 the shift is accomplished.

From the foregoing it will be apparent that movement of the walking beam 13 is transmitted to the horn 15 through the push rods 16 and 17 and the idler lever 19. The push rods constitute a pair of links and the idler lever a cooperating third link, one end of each of the three links having a common pivotal connection at 18. A fourth link 34 and the arm 36 provide means for pivotally supporting the other end of the third link 19 while the arm 36 may be moved by the lever 35 to adjust the position of the pivotal support so provided and thereby cause the common pivotal connection of the links 16, 17, and 19 to describe a predetermined arc when the pair of links 16 and 17 is actuated to operate the control surface.

The shifting operation may be controlled by a handle 37 convenient to the pilot, which handle is connected through a cable system 38 to a small walking beam 39 offset relative to the axis of the levers 14 and 35. This walking beam 39 drives a shaft 40 carrying a gear sector 41 which meshes with a gear segment 42 forming an integral part of the lever 35, which is free to turn on the shaft 43 forming the axis of the lever 14, and to which the walking beam 13 is secured. As a matter of convenience, the gear ratio between the sector and segment is made 2 to 1 so that a 90° movement of the walking beam provides the required 180° movement of the lever 35. The shaft 40 is also utilized to operate a shutoff cock 44 for the hydraulic fluid, and to simultaneously operate linkage 45 opening bypass valves 46 from one end of the booster cylinder to the other, in order to eliminate the liquid load during emergency manual operation of the control.

The detailed arrangement of Figure 7, which corresponds to the showings of Figures 2 and 4, utilizes duplicate gear segments and sectors, and the various rods and links are also duplicated both for safety and to provide a balanced load structure, although for the sake of simplicity the preceding description of the arrangement was given in the singular, to correspond to the schematic showings of Figures 1 and 3.

In order to lock the pivot 20 at its two extreme positions, the bent link 36 is provided, near its connection 47 to the shift lever 35, with a spring urged latch 48 engageable with latch pins 49 located on a stationary part of the supporting structure at each extremity of the movement of the lever 35. As shown in the enlarged detail of Figure 6, the latch snaps over the pin 49 and can only be released therefrom by a reverse movement of the lever 35 which moves the connection 47 back in an elongated slot 50 in the bent link 36, the connection 47 then pushing against a trigger 51 on the latch 48 to pivot the latter clear of the pin 49. This latch works the same way at both extremes of the movement of the lever 35 and provides a snappy click readily felt at the handle 37, thus indicating completion of the shifting operation. However, failure to fully complete the shifting operation is not critical since the control column 10 is not disconnected from the control surface during the shift, thus providing an important safety feature in that the pilot does not lose control of the airplane in the event the shift mechanism jams at an intermediate point of its movement.

While the operation of the shift, from booster operation of the control surface over the full range, to manual operation over a limited range accompanied by an increase in the leverage or mechanical advantage, will be readily understood from the foregoing detailed description; the practical use of this invention is as a standby or emergency control usable upon failure or malfunctioning of the power booster system. Thus the pilot would shift over to the emergency manual control at a time when unable to actuate the same against the aerodynamic loads which build up as the control surface is shifted from its neutral position, so that such a shift would ordinarily be made with the control surface in neutral or with the forces therein trimmed out by adjustment of the usual trim tab. While the shift could also be made while the power booster was in operation, and with the control surfaces deflected, in such a case the difference between the pilot force applied under power boost conditions and under direct manual operation would apply an increased reaction at the control column. However, the control column at all times remains in operative connection with the control surface, so that if the shift is started under other than neutral control conditions it can be carried through by the partial release and/or trimming out of the load on the control surfaces. It will be understood, of course, that airplane controls should be reversible, in that release of the control column allows aerodynamic forces acting on the surface to return such surface and its control column to a neutral or balanced position, so that in practice the pilot has only to let go the column and pull the shift lever in order to shift over to the emergency control.

It will thus be seen that we have invented an emergency control mechanism whereby the pilot is enabled to exert increased forces over a more limited range of movement in the event power booster is out of action, to the end that sufficient control may be retained to enable maneuvering of the airplane at low speeds, as would be required on coming in for a landing, or for maintaining control during normal flight wherein rapid and prompt response to control movements is not necessary.

We claim as our invention:

1. In an airplane control surface operating mechanism, including a manually operated control member, and a power booster system normally energized by movement of said member to supplement or boost the force applied to said control surface, linkage connecting said control member and surface for directly applying the manual effort imposed on the member to said control surface in proportion to the booster energy also imposed thereon throughout the full range of said booster system, and means for manually increasing the mechanical advantage of said linkage over a limited portion of said range upon failure of said booster system.

2. In an airplane control surface operating mechanism, including a manually operated control member, and a power booster system normally energized by movement of said member to supplement the force applied to said control surface, linkage connecting said control member and surface for directly applying the manual effort imposed on the member to said control surface in proportion to the booster energy also imposed thereon, said linkage including a variably fulcrumed idler lever and means for changing the fulcrum point of said lever whereby to change the mechanical advantage of the linkage between said control member and said control surface.

3. In an airplane control surface operating mechanism, including a manually operated control member, and a power booster system normally energized by movement of said member to supplement to boost the force applied to said control surface, a jointed linkage connecting said control member and surface for directly applying the manual effort imposed on the member to said control surface in proportion to the booster energy also imposed thereon, and means for varying the range and leverage of said linkage, including a variable fulcrum point for the joint in said linkage and manual means for shifting said fulcrum point, whereby to alter the mechanical advantage of said linkage.

4. In combination with a power booster control for airplane control surfaces and the like, wherein the operator normally supplies a proportion of the force actuating such control surfaces, the control surface having a manually operated lever mechanically linked to said control surface and to the power booster control for energizing the latter, said mechanical linkage including a pair of push rods in sequential relationship having an intermediate pivotal connection therebetween, an idler lever connected at one end to said intermediate pivotal connection, an adjustable support for the other end of said idler lever, the adjustment of said support being so arranged as to alter the arcuate path of said pivotal connection whereby to alter the mechanical advantage of the linkage between the manually operated lever and the control surface.

5. In combination with a power booster control for airplane control surfaces and the like, wherein the operator normally supplies a proportion of the force actuating such control surfaces, the control surface having a manually operated lever mechanically linked to said control surface and to the power booster control for energizing the latter, said mechanical linkage including a pair of push rods in sequential relationship having an intermediate pivotal connection therebetween, an idler lever connected at one end to said intermediate pivotal connection, an adjustable support for the other end of said idler lever, the adjustment of said support being so arranged as to alter the arcuate path of said pivotal connection, and shifting means for said support including a shift lever convenient to said operator, a crank connected to the other end of said idler lever for moving the same, and means connecting said shift lever to said crank.

6. In combination with a power booster control for airplane control surfaces and the like, wherein the operator normally supplies a proportion of the force actuating such control surfaces, the control surface having a manually operated layer mechanically linked to said control surface and to the power booster control for energizing the latter, said mechanical linkage including a pair of push rods in sequential relationship having an intermediate pivotal connection therebetween, an idler lever connected at one end to said intermediate pivotal connection, an adjustable support for the other end of said idler lever, the adjustment of said support being so arranged as to alter the arcuate path of said pivotal connection, and shifting means for said support including a shift lever convenient to said operator, a crank connected to the other end of said idler lever for moving the same, and means associated with said crank and adapted to render said power booster inoperative upon shifting movement of said crank.

7. In combination with a power booster control for airplane control surfaces and the like, wherein the operator normally supplies a portion of the force actuating such control surfaces, the control surface having a manually operated lever mechanically linked to said control surface and to the power booster control for energizing the latter, said mechanical linkage including a pair of push rods in sequential relationship having an intermediate pivotal connection therebetween, an idler lever connected at one end to said intermediate pivotal connection, an adjustable support for the other end of said idler lever, the adjustment of said support being so arranged as to alter the arcuate path of said pivotal connection, and shifting means for said support including a shift lever convenient to said operator, a crank connected to the other end of said idler lever for moving the same, and means for latching said crank at both extremities of its movement.

8. In a mechanism for controlling a maneuvering element of aircraft and the like, a power booster system connected to said element to normally supply a portion of the force required for movement of said element, a manual control connection to both the power booster and to the maneuvering element, said manual control connection being so arranged as to both supply the remaining portion of the force required for movement of said element and to energize said power booster system, the connection including a variable leverage multiple linkage system, and shifting means for an intermediate position of said variable leverage linkage adapted to simultaneously increase the mechanical advantage of said linkage system and to render said power booster inoperative.

9. In a mechanism for controlling a maneuvering element of aircraft and the like, a power booster system connected to said element to normally supply a portion of the force required for movement of said element, a manual control connection to both the power booster and to the maneuvering element, said manual control connection being so arranged as to both supply the remaining portion of the force required for movement of said element and to energize said power booster system, means in said control connection so constructed and arranged as to provide a variable leverage linkage which is normally operative throughout the full range of said booster system and manually-operable shifting means for said variable leverage linkage adapted to increase the mechanical advantage of said linkage system over an intermediate portion of said range.

10. In a mechanism for controlling a maneuvering element of aircraft and the like, a power booster system connected to said element to normally supply a portion of the force required for movement of said element, a manual control connection to both the power booster and to the maneuvering element, said manual control connection being so arranged as to both supply the remaining portion of the force required for movement of said element and to energize said power booster system, the connection including a variable leverage linkage system having a variably fulcrumed idler lever, and shifting means for moving the fulcrum of said idler lever, whereby to increase the mechanical advantage of said linkage system over a predetermined narrow range of movement of said maneuvering element.

11. Mechanism for operating a control surface of an airplane including a manually operable control member, means connecting said control member and control surface, said means including three links, means for providing a common pivotal connection for one end of each of said links, a pair of said links being so arranged that the manual effort imposed on said control member is transmitted through them to said control surface, means for pivotally supporting the other end of the third link so that said common pivotal connection will describe a predetermined arc when said pair of links is actuated to operate said control surface, and means for adjusting the position of said last named means, whereby to vary the location of the center about which said arc is described and in so doing enable the mechanical advantage of said links to be varied, at will, with respect to a predetermined portion of the range of movement of said control surface.

12. Mechanism for operating a control surface of an airplane including a manually operable control member, means connecting said control member and control surface, said means including three links, means for providing a common pivotal connection for one end of each of said links, a pair of said links being so arranged that the manual effort imposed on said control member is transmitted through them to said control surface, a fourth link, a fixed support to which one end of said fourth link is pivotally connected, an arm to which the other end of said fourth link and the other end of the remaining of said three links, are pivotally connected, whereby said common pivotal connection will describe a predetermined arc when said pair of links is actuated to operate said control surface, and means for adjusting the position of said arm to vary the locaton of the center about which said arc is described and in so doing enable the mechanical advantage of said links to be varied, at will, with respect to a predetermined portion of the range of movement of said control surface.

CLARENCE L. JOHNSON.
ROBERT R. RICHOLT.

REFERENCES CITED

The following references are of record in the file of this patent:

UNITED STATES PATENTS

| Number | Name | Date |
|---|---|---|
| 841,601 | Summers | Jan. 15, 1907 |
| 1,258,337 | Imblum | Mar. 5, 1918 |
| 1,260,780 | Latshaw | Mar. 26, 1918 |
| 1,702,184 | Uwins | Feb. 12, 1929 |
| 1,906,222 | Boland | May 2, 1933 |
| 1,937,471 | Dean | Nov. 28, 1933 |
| 2,092,738 | Rodgers | Apr. 7, 1937 |
| 2,227,273 | Price | Dec. 31, 1940 |
| 2,265,546 | Price | Dec. 9, 1941 |
| 2,274,734 | Pelterie | Mar. 3, 1942 |
| 2,278,557 | Overbeke | Apr. 7, 1942 |
| 2,284,298 | Newton | May 26, 1942 |
| 2,338,379 | Henke | Jan. 4, 1944 |
| 2,366,382 | Burton | Jan. 2, 1945 |

FOREIGN PATENTS

| Number | Country | Date |
|---|---|---|
| 346,729 | Great Britain | 1931 |